United States Patent Office 2,757,090
Patented July 31, 1956

2,757,090
PHOTOGRAPHIC METHOD AND LIGHT SENSITIVE ARTICLE FOR MAKING PRINTING PLATES

Wilhelm Neugebauer and Martha Tomanek, Wiesbaden-Biebrich, Germany, assignors, by mesne assignments, to Azoplate Corporation, Summit, N. J., a corporation of New Jersey No Drawing. Application August 26, 1952,
Serial No. 306,506

Claims priority, application Germany September 1, 1951

13 Claims. (Cl. 95—8)

The present invention relates to light sensitive material. More specifically, it relates to light sensitive material suitable for photomechanical reproduction, particularly for the manufacture of lithographic printing plates.

It has been found that excellent light sensitive material suited for use in the field of photomechanical reproduction is obtained by applying to a suitable base material an unsaturated aldehyde corresponding with the general formula:

$$R-(CR_1=CR_2)_x-CHO$$

in which R stands for a member selected from the group consisting of aromatic and heterocyclic residues and substitution products of both, $R_1$ and $R_2$ stands for a member selected from the group consisting of hydrogen, halogen, alkyl radicals and aromatic residues and $x$ stands for one of the whole numbers 1 and 2.

Substituted aldehydes with one double linkage and aldehydes with two double linkages will frequently be preferred over non-substituted aldehydes having one double linkage, because the products resulting from the light sensitive material obtained by the employment of both first-mentioned groups of aldehydes exhibit a higher degree of adhesion for the greasy ink applied to the material after exposure and development.

The following aldehydes are listed as examples of aldehydes corresponding with the above-mentioned formula:

(1) Cinnamaldheyde of the formula:

(2) 2-nitro-cinnamaldehyde (M. P.=127° C.) of the formula:

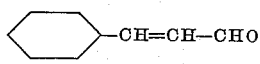

described by Diehl and Einhorn in "Berichte der Deutschen Chemischen Gesellschaft," 18th annual publication (1885), page 2336.

(3) 4-nitro-cinnamaldehyde (M. P.=141°–142° C.) of the formula:

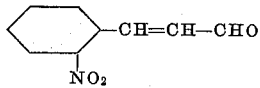

described by Einhorn and Gehrenbeck in "Liebig's Annalen der Chemie," volume 253 (1889), page 348.

(4) 4 - methoxy - cinnamaldehyde (M. P.=58° C., B. P.14=173°–174° C.) of the formula:

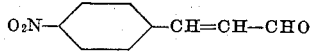

described by Vorländer and Giesler in "Journal für praktische Chemie," volume 121 (1929), page 238.

(5) Piperonylidene-acetaldehyde (M. P.=84.5°–85.5° C.) of the formula:

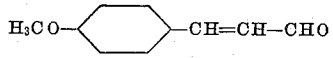

described by Winsheimer in "Berichte de Deutschen Chemischen Gesellschaft," 41st annual publication (1908), page 2378.

(6) β-[α-furyl]-acrolein (M. P.=51° C.) of the formula:

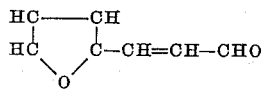

described by Röhmer in "Berichte der Deutschen Chemischen Gessellschaft," 31st annual publication (1898), page 283.

(7) α-Furfurylidene-propionaldehyde (an oil that easily resinifies) of the formula:

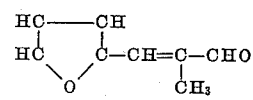

described by Schmidt in "Berichte der Deutschen Chemischen Gesellschaft," 14th annual publication (1881), page 574.

(8) 1-phenyl-1,3-pentadiene-al-(5) (B. P.12=160°–162° C.) of the formula:

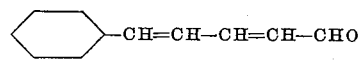

described by Kuhn and Winterstein in "Helvetica Chimica Acta," volume 12 (1929), page 496.

(9) α-Chloro-cinnamaldehyde (M. P.=34°–36° C.) of the formula:

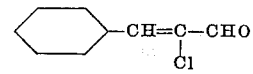

described by Naar in "Berichte der Deutschen Chemischen Gesellschaft," 24th annual publication (1891), page 246.

(10) α-phenyl-cinnamaldehyde (M. P.=94° C.) of the formula:

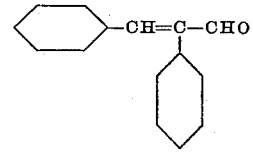

described by Meerwein in "Journal für praktische Chemie," volume 97 (1918), page 281.

The production of light sensitive layers by means of unsaturated aldehydes in accordance with this invention is effected by applying solutions of the aldehydes to a suitable base, for instance to metal, in particular aluminum plates that may be covered with a layer of oxide produced chemically or electrochemically. The solution can be applied, for instance, by means of a plate whirler. The coated material is then dried. The solutions used for coating the base support are prepared with the aid of organic solvents, such as alcohol, dioxane, pyridine, benzene, or glycol-monomethyl ether, or with mixtures of organic solvents. It is possible also to employ mixtures containing several of the unsaturated aldehydes that are to be used in accordance with this invention. Hardenable colloids are not necessary for the purpose of producing the layer.

It has been found, furthermore, that it is possible in general to improve the light sensitive layers by the addition of aromatic hydroxyl compounds, quinones, or dyestuffs belonging to the thiazine series. This improvement very probably finds its explanation in the fact that the aforementioned addition substances exert an action preventing or retarding the polymerization of the unsaturated aldehydes; said improvement is primarily manifested by the prolonged storability of the light sensitive layers.

Effective polymerization inhibitors to be mentioned, for example, are phenols, such as hydroquinone; quinones, for example p-benzoquinone, p-toluquinone, and chloranil (2,3,5,6-tetrachloro-benzoquinone-1,4); dyes belonging to the thiazine series, like thionine (Schultz, Farbstofftabellen, 7th edition, vol. 1, 1931, page 448, No. 1036), thionine blue G (same reference, page 452, No. 1042), methylene blue B (same reference, page 449, No. 1038), toluidine blue O (same reference, page 451, No. 1041) and similar dyes.

The addition of very small quantities of the polymerization inhibitors is quite sufficient as a rule. A quantity of 0.1%, for instance, based on the amount of the aldehyde or the aldehyde mixture used, suffices in most cases. The procedure followed in practice is to add the polymerization inhibitors to the coating solutions that contain the light sensitive aldehydes.

The production of printing plates is an important field of application for this invention. In order to produce such printing plates, the coated materials are exposed to light behind a pattern. Such exposure can be effected, for instance, by means of arc lamps or mercury lamps. During the exposure, the unsaturated aldehydes, which are colored yellow in most cases, bleach at those areas of the light sensitive layer which are struck by light. These areas containing the bleached unsaturated aldehydes are hereinafter referred to as "imaged areas." Light-transformation products are thus produced, and a positive image, colored yellow in most cases, appears initially when the exposure is effected through a positive master pattern. When the exposed layer is then treated with dilute acid, e. g. phosphoric acid, and subsequently rubbed in with greasy ink in the presence of water, the ink adheres to the image areas of the surface of the plate where the light-transformation products are present, while the ink is not accepted at the areas which were not struck by light. Those areas not struck by light are hereinafter referred to as "non-imaged areas." It is possible also to rub in the exposed material simultaneously with greasy ink and dilute acid or to rub in the greasy ink first and subsequently to treat the material with dilute acid.

Positive images are obtained from negative patterns or negative images are obtained from positive patterns. These images can be used, for example, after being inked, for printing plates for planographic printing.

The following examples are inserted in order to illustrate the present invention. Restriction of the invention to the subject matter described in the examples is not intended. The parts if not otherwise stated are by weight.

(1) A solution of 1.5 parts of 2-nitro-cinnamaldehyde (Formula 2) in 100 parts by volume of alcohol is applied to a mechanically roughened aluminum foil, for instance by means of a plate whirler, and is dried at a temperature of approximately 50° C. The coated side of the aluminum foil is exposed to light under a negative pattern, for example, an 18 ampere arc lamp may be used for about two minutes at a distance of 60 cm. Then the exposed layer is developed by wiping it with a 2% solution of phosphoric acid, and the developed foil surface is rubbed in with greasy ink. A positive image is obtained which can be used for printing after the aluminum foil bearing the image has been placed in an offset printing machine.

(2) The procedure described in Example 1 is followed, with the difference, however, that the aluminum foil is coated with the solution of a mixture consisting of one part of cinnamaldehyde (Formula 1) and of one part of 4-nitro-cinnamaldehyde (Formula 3) in 100 parts by volume of glycol-monomethyl ether. In this case, also, a positive image and printing plate is obtained.

(3) A superficially oxidized aluminum foil is coated with a 1.5% solution of 4-methoxy-cinnamaldehyde (Formula 4) in a mixture containing equal parts by volume by dioxane and alcohol. The coated foil is dried and then exposed to light under a negative pattern. Thereafter the procedure described in Example 1 is followed. A positive printing plate is thus obtained.

(4) One part of β-[α-furyl]-acrolein (Formula 6) is dissolved in 100 parts by volume of alcohol; this solution is used for coating an aluminum plate, and the coated plate is then dried. Subsequently the coated material is exposed to light under a negative pattern, the exposed layer is developed by wiping over with a 2% solution of sulfuric acid or a 2% solution of nitric acid, and the developed surface is rubbed in with greasy ink. A positive printing plate is thus obtained from the negative master pattern.

(5) An aluminum plate, which may be mechanically roughened, is coated with a solution of 2 parts of α-chloro-cinnamaldehyde (Formula 9) in 100 parts by volume of alcohol. The coated plate is dried and then exposed to light under a negative pattern. The exposed surface of the plate is rubbed in simultaneously with greasy ink and a 2% solution of phosphoric acid. A positive image is thus obtained.

(6) The procedure described in Example 1 is followed, with the difference, however, that the solution of 1.5 parts of piperonylidene-acetaldehyde (Formula 5) and of 0.1 part of methylene blue G or of thionine in 100 parts by volume of alcohol is used for coating the foil. A positive image and printing plate is obtained in this case also. The addition of one of the thionine dyes results in increased storability or "shelf-life."

(7) The procedure outlined in Example 1 is followed, with the difference, however, that the coating of an aluminum plate is effected with a solution of a mixture consisting of 1 part of 1-phenyl-1,3-pentadiene-al-(5) (Formula 8) and of 0.1 part of p-toluquinone or benzoquinone in 100 parts by volume of alcohol and that a 3% solution of phosphoric acid with an addition of 5% of alcohol is used for developing. The addition of p-toluquinone or of benzoquinone results in increased storability of the plate coated in this manner.

(8) 1 part of α-furfurylidene-propionaldehyde (Formula 7), 0.5 part of α-phenyl-cinnamaldehyde (Formula 10), and 0.1 part of chloranil (2,3,5,6-tetrachloro-p-benzoquinone) or 0.1 part of hydroquinone are dissolved in 100 parts by volume of alcohol. This solution is used for coating an aluminum plate, and the coated plate is then dried. The coated side of the plate is subsequently exposed to light for 2 minutes under a negative pattern, developed by wiping over with a 4% solution of phosphoric acid and rubbed in with greasy ink. A positive printing plate is obtained in this manner. The addition of hydroquinone or chloranil results in increased storability.

The temperatures used in drying the base coated with a solution of the light sensitive aldehyde should not exceed 100° C.

Having thus described the invention, what is claimed is:

1. The method of producing printing plates comprising the steps of coating a sheet metal base material with a thin uniform layer of an unsaturated aldehyde of the general formula

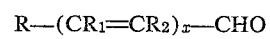

$$R-(CR_1=CR_2)_x-CHO$$

in which R is a member selected from the group consisting of heterocyclic radicals, mononuclear aryl radicals and mononuclear aryl radicals substituted by a substituent selected from the group consisting of alkoxy and nitro, $R_1$=hydrogen $R_2$=a member of the group consisting of hydrogen, halogen, alkyl radicals and phenyl and $x$ is selected from the group consisting of the whole numbers 1 and 2, exposing the coated base to a light image, treating the exposed surface with dilute acid to remove those areas of the layer not struck by light, and rubbing in the image with greasy ink.

2. The method of producing printing plates comprising the steps of coating a sheet metal base material with a thin uniform layer consisting of 2-nitro-cinnamaldehyde, exposing the coated base to a light image, treating the exposed surface with dilute acid to remove those areas of the layer not exposed to light and rubbing in the image with greasy ink.

3. The method of producing printing plates comprising the steps of coating a sheet metal base material with a thin uniform layer of 4-nitro-cinnamaldehyde, exposing the coated base to a light image, treating the exposed surface with dilute acid to remove those areas of the layer not exposed to light and rubbing in the image with greasy ink.

4. The method of producing printing plates comprising the steps of coating a sheet metal base material with a thin uniform layer of 4-methoxy-cinnamaldehyde, exposing the coated base to a light image, treating the exposed surface with dilute acid to remove those areas of the layer not exposed to light and rubbing in the image with greasy ink.

5. The method of producing printing plates comprising the steps of coating a sheet metal base material with a thin uniform layer of β-[α-furyl]-acrolein, exposing the coated base to a light image, treating the exposed surface with dilute acid to remove those areas of the layer not exposed to light and rubbing in the image with greasy ink.

6. Light-sensitive material for the manufacture of printing plates comprising a sheet metal base material, said base having a coating thereon consisting of a thin uniform light sensitive layer of unsaturated aldehydes of the formula $$R-(CR_1=CR_2)_x-CHO$$

in which R is a member selected from the group consisting of heterocyclic radicals, mononuclear aryl radicals and mononuclear aryl radicals substituted by a substituent selected from the group consisting of alkoxy and nitro, $R_1$=hydrogen $R_2$=a member of the group consisting of hydrogen, halogen, alkyl radicals and phenyl and $x$ is selected from the group consisting of the whole numbers 1 and 2.

7. Light-sensitive material for the manufacture of printing plates comprising a sheet metal base material, said base having a thin uniform light-sensitive coating thereon consisting of unsaturated aldehydes of the formula $$R-(CR_1=CR_2)_x-CHO$$

in which R is a member selected from the group consisting of heterocyclic radicals, mononuclear aryl radicals and mononuclear aryl radicals substituted by a substituent selected from the group consisting of alkoxy and nitro, $R_1$=hydrogen $R_2$=a member of the group consisting of hydrogen, halogen, alkyl radicals and phenyl and $x$ is selected from the group consisting of the whole numbers 1 and 2, and a polymerization inhibitor selected from the group consisting of phenols, quinones and thiazine dyes.

8. Light sensitive material for the manufacture of printing plates comprising a sheet metal base material, said base having a coating thereon consisting of a thin uniform light sensitive layer of 2-nitro-cinnamaldehyde.

9. Light sensitive material for the manufacture of printing plates comprising a sheet metal base material, said base having a coating thereon consisting of a thin uniform light sensitive layer of 4-nitro-cinnamaldehyde.

10. Light sensitive material for the manufacture of printing plates comprising a sheet metal base material, said base having a coating thereon consisting of a thin uniform light sensitive layer of 4-methoxy-cinnamaldehyde.

11. Light sensitive material for the manufacture of printing plates comprising a sheet metal base material, said base having a coating thereon consisting of a thin uniform light sensitive layer consisting of β-[α-furyl]-acrolein.

12. A printing plate consisting of a sheet metal base having an image thereon, said image consisting of the light decomposition products of unsaturated aldehydes of the general formula $$R-(CR_1=CR_2)_x-CHO$$

in which R is a member selected from the group consisting of heterocyclic radicals, mononuclear aryl radicals and mononuclear aryl radicals substituted by a substituent selected from the group consisting of alkoxy and nitro, $R_1$=hydrogen $R_2$=a member of the group consisting of hydrogen, halogen, alkyl radicals and phenyl.

and $x$ is selected from the group consisting of the whole numbers 1 and 2.

13. A printing plate consisting of a sheet metal base having an image thereon, said image consisting of the light-decomposition products of unsaturated aldehydes of the general formula $$R-(CR_1=CR_2)_x-CHO$$

in which R is a member selected from the group consisting of heterocyclic radicals, mononuclear aryl radicals and mononculear aryl radicals substituted by a substituent selected from the group consisting of alkoxy and nitro, $R_1$=hydrogen $R_2$=a member of the group consisting of hydrogen, halogen, alkyl radicals and phenyl.

and $x$ is selected from the group consisting of the whole numbers 1 and 2, and a polymerization inhibitor selected from the group consisting of phenols, quinones and thiazine dyestuffs.

References Cited in the file of this patent

UNITED STATES PATENTS

| | | |
|---|---|---|
| 1,965,710 | Murray | July 10, 1934 |
| 2,610,120 | Minsk et al. | Sept. 9, 1952 |

OTHER REFERENCES

Vorlander et al.: Journal fur Praktische Chemie 121 (1929), page 238.

Diehl et al.: Berichte der Deutschen Chemischen Gesellschaft (1885).

Einhorn et al.: Liebig's Annalen der Chemie 253 (1889), page 348.

Winsheimer: Berichte der Deutschen Chemischen Gesellschaft, (1908), page 2378.

Lockrey: Halftone Processes (second ed.) Pub. J. J. Tepper Corp., N. Y., pgs. 48–50.